United States Patent [19]

Falkner

[11] Patent Number: 5,713,008
[45] Date of Patent: Jan. 27, 1998

[54] DETERMINATION OF WORKING SETS BY LOGGING AND SIMULATING FILESYSTEM OPERATIONS

[75] Inventor: Sam L. Falkner, Colorado Springs, Colo.

[73] Assignee: Sun Microsystems, Palo Alto, Calif.

[21] Appl. No.: 486,006

[22] Filed: Jun. 8, 1995

[51] Int. Cl.$^6$ .................................................. G06F 9/455
[52] U.S. Cl. .................... 395/500; 395/445; 395/497.01; 364/DIG. 1; 364/243.41
[58] Field of Search ...................... 395/500, 600, 395/425, 400, 375, 463, 460, 440, 497.01, 445; 364/200 MS File

[56] References Cited

U.S. PATENT DOCUMENTS

| | | | |
|---|---|---|---|
| 5,113,519 | 5/1992 | Johnson et al. | 395/600 |
| 5,226,141 | 7/1993 | Esbensen | 395/425 |
| 5,235,690 | 8/1993 | Beardsley et al. | 395/425 |
| 5,241,638 | 8/1993 | Mork et al. | 395/400 |
| 5,355,478 | 10/1994 | Brady et al. | 395/600 |
| 5,386,536 | 1/1995 | Courts et al. | 395/425 |
| 5,396,604 | 3/1995 | DeLano et al. | 395/375 |
| 5,404,484 | 4/1995 | Schlansker et al. | 395/425 |
| 5,452,440 | 9/1995 | Salsburg | 395/463 |
| 5,544,343 | 8/1996 | Swenson et al. | 395/460 |
| 5,555,391 | 9/1996 | De Subijana et al. | 395/440 |
| 5,581,736 | 12/1996 | Smith | 395/497.01 |
| 5,584,007 | 12/1996 | Ballard | 395/440 |
| 5,588,129 | 12/1996 | Ballard | 395/440 |

OTHER PUBLICATIONS

"A File–Based Adaptive Prefetch Caching Design", BY F. Shih et al., IEEE, Computer Design—ICCD '90, 1990 International Conference, pp. 463–466.

"Disk Cache Performance for Distributed Systems", by D. Makaroff et al., IEEE, Distributed Computing Systems, 1990 International Conference, Jul. 1990, pp. 212–219.

"Strategies to Improve I/O Cache Performance", by K. Richardson et al., IEEE System Sciences, 1993 Annual Hawaii International Conference, pp. 31–39.

"Flash Memory File Caching for Mobile Computers", by B. Marsh et al., IEEE, System Sciences, 1994 Annual Hawaii International Conference, pp. 451–460.

"Flying with Instruments: Characterizing the NCAR MSS–III Workload", by J. Sloan, Mass Storage Systems, 1994 13th IEEE Symposium, pp. 57–62.

"Simulation and Performance Evaluation of Parallel Architecture based on i860 nodes: SapePar–i860" by A. Pandian et al., TENCON '94—1994 IEEE Region 10 Conference, pp. 682–686.

*Primary Examiner*—Kevin J. Teska
*Assistant Examiner*—Russell W. Frejd
*Attorney, Agent, or Firm*—Pupak Nag Hickman Bever & Weaver

[57] ABSTRACT

A method and apparatus for determining the size of a file cache for storing data is described. The method includes activating a filesystem logging mechanism to monitor filesystem transactions performed on the computer by the user. Next, a file cache is provided under computer control for storing at least a portion of at least one computer file. Also, a filesystem log file is provided for storing records of filesystem transactions invoked by the computer. A user work cycle is then performed during which the filesystem logging mechanism monitors filesystem transactions invoked by the computer and stores records of certain filesystem transactions to the filesystem log file. Finally, the size of the file cache required to store the information cached during the work cycle is determined by processing the log file. Also provided is a computer program product having computer readable code for determining the size of a file cache.

30 Claims, 11 Drawing Sheets

DETERMINATION OF WORKING SETS BY LOGGING AND SIMULATING FILESYSTEM OPERATIONS

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. The Field of the Invention

The present invention relates to the fields of computing systems, network operating systems and the client-server computing. More specifically, the present invention provides a method and apparatus for determining the size of a file cache on a client computer coupled to a fileserver computer.

2. The Background Art

Many computer networks include a fileserver computer that is coupled to one or more client computers. The fileserver computer holds various computer files and programs that are accessed by the client computers on the network, in accordance with various limitations established by the network operating system (e.g., AppleShare, NetWare or Network File System (NFS)). Thus, the fileserver functions as a public repository of programs and files for access by all computers on the network.

Under some network operating systems, clients make requests through the network filesystem to the fileserver to download program code or files to their local machines. This configuration is advantageous in many situations as it allows for a multiplicity of users to access a single software program resident on the fileserver. This provides greater ease of network maintenance as only one piece of software must be purchased and maintained; multiple users can be accommodated through a license without acquiring additional copies of the software. Similarly, the storage of files on a fileserver offers advantages with respect to making files available to other users for workgroup projects and data backup. Also, other types of data such as directories and symbolic links can be stored at the fileserver for use by several clients.

However, use of such a centralized fileserver to provide both software and file access can suffer from poor performance as network traffic can grows, e.g., with an increasing number of users of the computer network. Thus, it would be advantageous to allow the users of the local machines to store segments of software and data (e.g., 64 kilobytes blocks of code or data) to reduce the burden on network traffic. Such a strategy is commonly employed by providing on the client computer a file cache into which segments of software code or data are stored for retrieval by the user. The fileserver merely downloads those portions of the executable code or data required by the local user to the file cache and the client computer executes the software for the user locally. This allows the fileserver access and network traffic to be kept to a minimum while allowing the user to enjoy the benefits of having a fileserver on which software and data are stored commonly. Generally, files that are downloaded to the client are limited to being "read only" to avoid confusion among multiple users. This protection, however, may be overridden.

Unfortunately, providing a file cache can be difficult as the user is required to estimate the amount of information to be stored on his or her client computer. If a user declares a file cache which is too large, then space for data storage at the client machine is wasted. On the other hand, if the file cache is too small the user suffers performance degradation as the operating system of the computer and/or network must continuously reassess the status of the data stored in the cache and shuffle data from the cache to the fileserver and back again as required by the client computer. Thus, it would be advantageous to provide a system in which an appropriate size of the file cache can be estimated accurately.

SUMMARY OF THE INVENTION

The present invention provides a method and apparatus for estimating a file cache size automatically, based on the transactions between the fileserver and the client computer that are performed by the user of the client computer. The method and apparatus of the present invention overcome the difficulties associated with estimated file cache sizes by providing a transparent logging of file operations invoked by the user and an analysis of the logged file operations to determine a cache size in accordance with the user's actual workload.

In one embodiment, the present invention provides a computer-implemented method for determining the size of a file cache on a computer. First, a filesystem logging mechanism is activated to monitor filesystem transactions performed on the computer by the user. Second, a file cache is provided under computer control for storing at least a portion of at least one computer file. A filesystem log file is also provided for storing records of filesystem transactions invoked by the computer. Third, a user work cycle is performed in which the filesystem logging mechanism monitors under computer control filesystem transactions invoked by the computer and stores records of certain filesystem transactions to the filesystem log file. Finally, the size of the file cache required to store the information cached during the work cycle is determined under computer control.

The determination of the file cache size of the computer-implemented method of the invention further includes, in one embodiment, the step of (a) determining the record type for each record stored in the filesystem log file, (b) processing each record stored in the filesystem log file and (c) updating a file cache size indicator. The processing step (b) can, in one embodiment, includes the steps of determining whether the record is a file record and that the record is recorded in an ad-hoc filesystem table, subtracting the amount of memory space occupied in the file cache by the data associated with the file record from the cache size and determining the present amount of memory space occupied by the data and adding that amount to the file cache size. In one embodiment this determination includes a further determination the file has been modified and that additional memory space should be added to the current cache size in the case in which the file associated with the record is an unmodified file.

In another aspect, the present invention provides a computer system for determining the size of a file cache on a computer. In one embodiment, the computer system of the invention first includes a filesystem logging mechanism that monitors under computer control filesystem transactions performed on the computer during a user work cycle and stores records of certain filesystem transactions to the filesystem log file. Also included is a file cache for storing at least a portion of at least one computer file and a filesystem log file for storing records of filesystem transactions invoked by the computer. Finally, the computer system of the invention, in this embodiment, also includes a filesystem log file processing mechanism to determine under computer control the size of the file cache required to store the data referenced in the filesystem transactions performed during the user work cycle.

In one embodiment, the computer of the computer system of the invention is coupled with a computer network including a fileserver. In another embodiment, the file cache is located in mass storage associated with the computer. The file cache may be present at the time the logging mechanism of the invention is activated, or the file cache may be constructed in response to a determination that no file cache is presently available to the computer. In still another embodiment, the logging records written to the filesystem log file include fields for at least a record type, an error status flag, a time stamp and a filesystem identifier.

In still another embodiment, the present invention provides a computer program product having computer readable code for determining the size of a file cache. The computer program product includes computer readable program code devices configured to cause a computer to activate a filesystem logging mechanism that operates under computer control to monitor filesystem transactions performed on the computer. Also included are computer readable program code devices configured to cause a computer to provide a file cache for storing a least a portion of at least one computer file therein and a filesystem log file for storing records of filesystem transactions invoked by the computer while the filesystem logging mechanism is monitoring filesystem transactions performed on the computer. In addition, the computer program product of the invention includes computer readable program code devices configured to cause a computer to store records of certain filesystem transactions invoked by the computer while the filesystem logging mechanism is monitoring filesystem transactions performed on the computer to the filesystem log file. Finally, the computer program product of the invention, in this embodiment, includes computer readable program code devices configured to cause a computer to determine the size of the file cache required to store the data referenced in records stored in the filesystem log file.

These and other aspects and advantages of the present invention will be become more fully apparent when the Description of Specific Embodiments below is read in conjunction with the accompanying Figures.

DESCRIPTION OF SPECIFIC EMBODIMENTS

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantifies.

Further, the manipulations performed are often referred to in terms, such as identifying, running, or comparing. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

Figure 1:
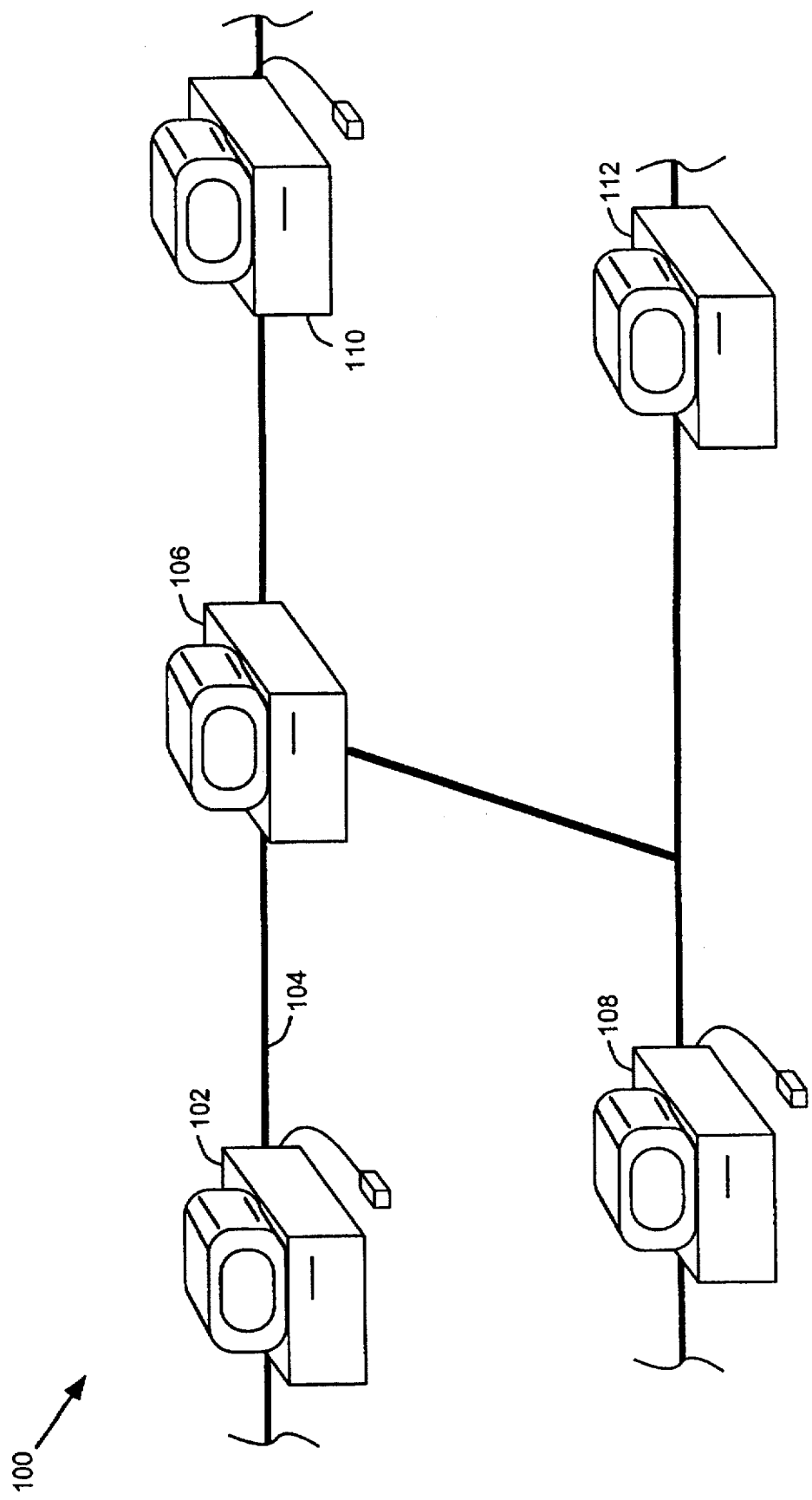
FIG. 1 is a diagram illustrating a computer network in accordance with the present invention.

In one embodiment of the present invention, one or more computers are linked together by network such as the network illustrated at 100 in FIG. 1. As seen in the Figure, network 100 includes computer 102 which computer is coupled to a network 104. Network 104 can further include a computer 106 that functions as a server, router or the like in addition to other computers 108, 110, and 112 such that data and instructions can be passed among the networked computers. In one embodiment, computers 102, 108, 110 and 112 are referred to as "client" computers and computer 106 as a "fileserver". Fileserver 106 functions to store and forward data, such as program code for execution or files for editing or processing, to clients 102, 108, 110 and/or 112. The design, construction and implementation of computer networks will be familiar to those of skill in the art.

Figure 2:
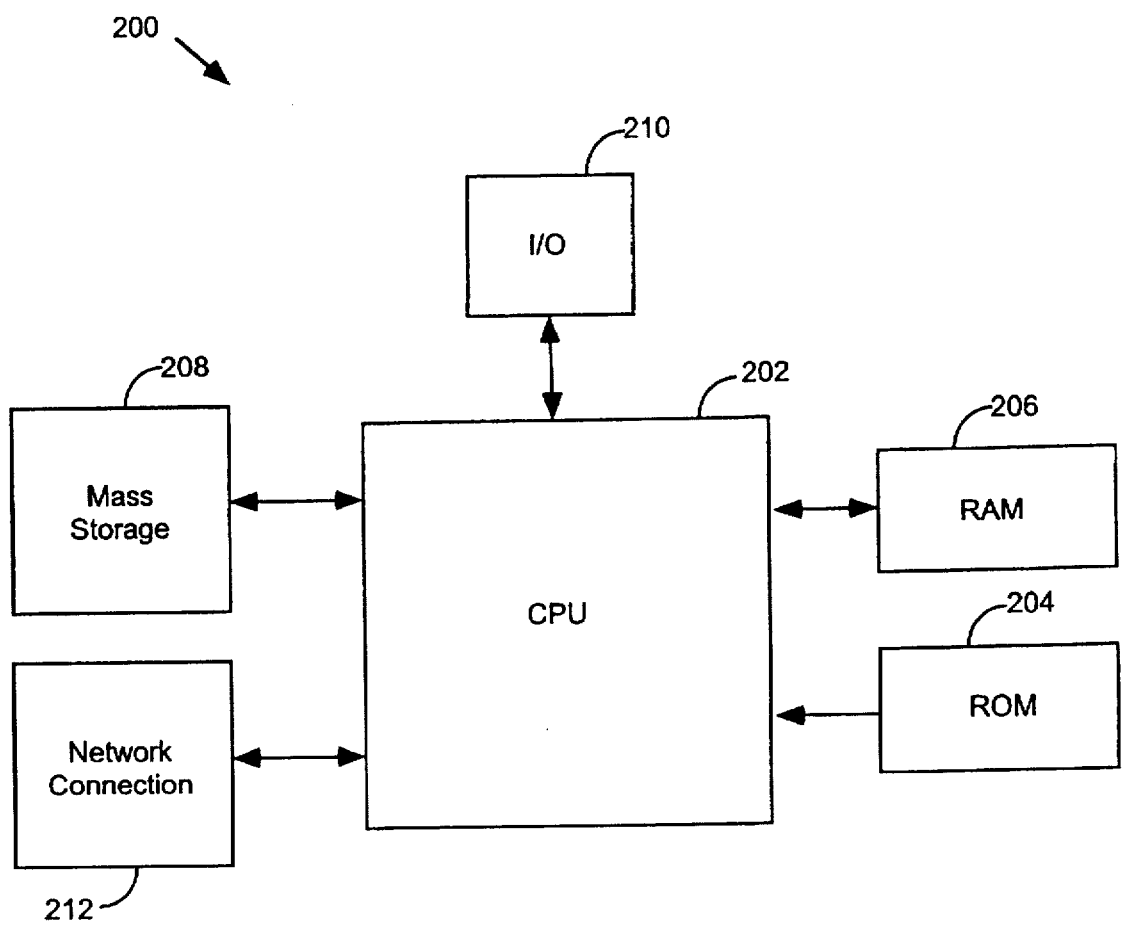
FIG. 2 is a diagram illustrating a computer system in accordance with the present invention.

Computers 102, 106, 108, 110, and 112 are illustrated schematically with respect to FIG. 2 at 200. Each computer includes a central processing unit (CPU) 202 which CPU is coupled bidirectionally with random access memory (RAM) 204 and unidirectionally with read only memory (ROM) 206. Typically, RAM 204 includes programming instructions and data, including distributed objects and their associated data and instructions, for processes currently operating on CPU 202. ROM 206 typically includes basic operating instructions, data and objects used by the computer to perform its functions. In addition, a mass storage device 208, such as a hard disk, CD ROM, magneto-optical (floptical) drive, tape drive or the like, is coupled bidirectionally with CPU 202. Mass storage device 208 generally includes additional programming instructions, data and objects that typically are not in active use by the CPU, although the address space may be accessed by the CPU, e.g., for virtual memory or the like. Each of the above described computers further includes an input/output source 210 that typically includes input media such as a keyboard, pointer devices (e.g., a mouse or stylus) and the like. Each computer can also include a Network Connection 212. Additional mass storage devices (not shown) may also be connected to CPU 202 through Network Connection 212. It will be appreciated by those skilled in the art that the above described hardware and software elements, as well as networking devices, are of standard designing construction are well familiar.

In one embodiment, one or more of client computers 102, 108, 110 and 112 includes a file cache for storing data maintained on server 106. The data stored in the file cache can include, but is not limited to, files or portions of files, executable program code, or portions of program code (e.g., modules), directories or portions of directories and symbolic links (i.e., pointers to files or programs, also known as aliases). The file cache may be located in memory associated the computer such as RAM 206 or Mass Storage 208 (e.g., a hard disk). In one embodiment, the file cache is stored in permanent memory such as a hard disk. It will be appreciated that using permanent storage allows the user to retain their desired file cache structure after power to the client has been turned off or if the client computer requires restarting (e.g., after an error). In another embodiment, the file cache is not alterable by the user. This can be accomplished by setting parameters in the network and/or client operating system to prevent editing of the file cache structure, or by writing the file cache in a binary or hexadecimal format which, it will be appreciated, is difficult to edit easily.

Figure 3:
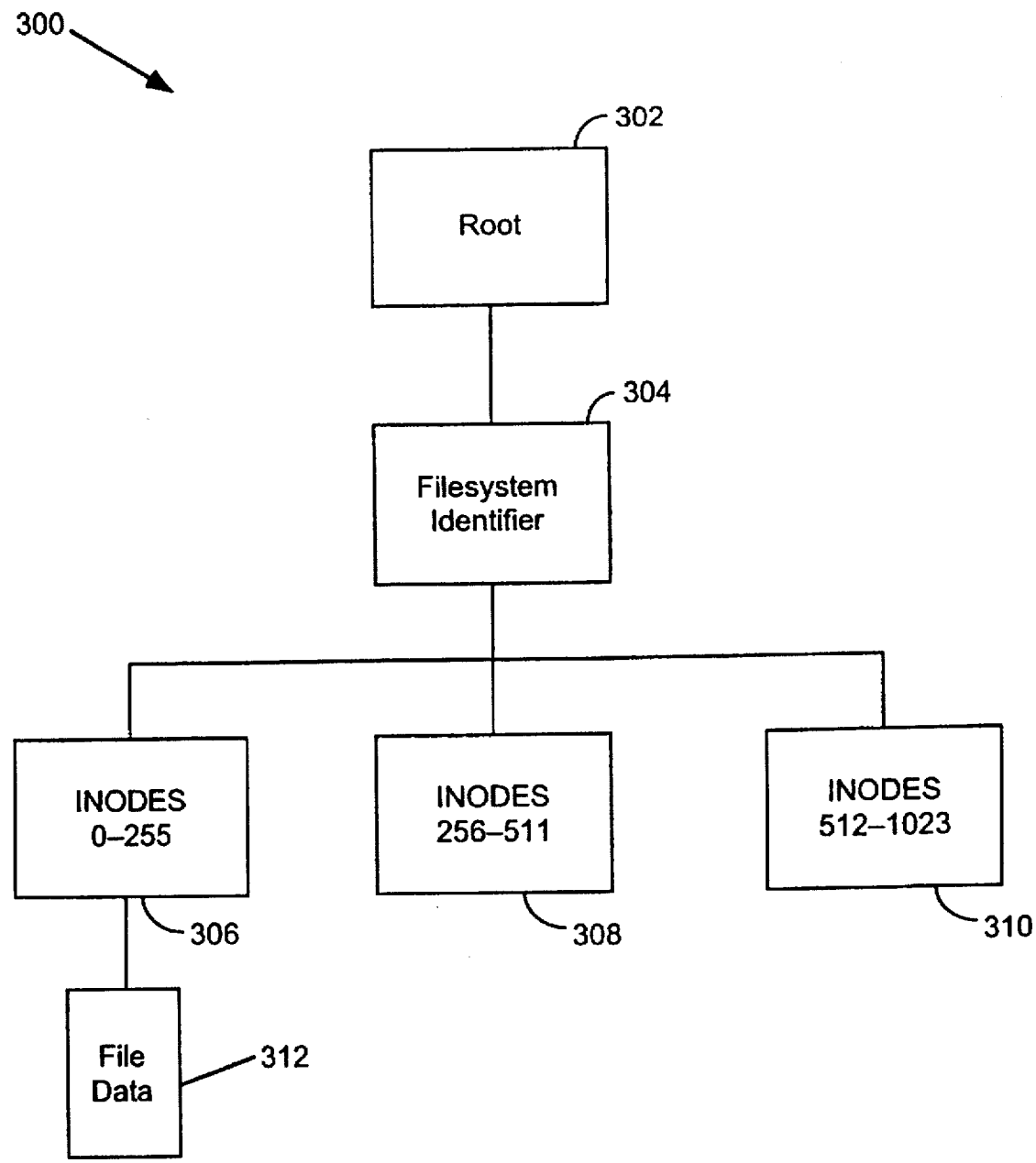
FIG. 3 is a diagram illustrating the data structure of a file cache in accordance with the present invention.

FIG. 3 illustrates one embodiment of a file cache in accordance with the present invention at 300. As shown in the figure, the file cache begins with a Root Level 302 under which Root Level is a directory indicating the filesystem identifier for the filesystem holding the data being cached. As used herein, the term "filesystem" refers to a location in memory (typically on a fileserver computer on a computer network) in which directories and data are maintained for access by other computers. There can be multiple filesystem identifiers in a file cache, one for each mounted filesystem. Preferably, the filesystem identifier is unique for each client. In one embodiment, the filesystem identifier is the path of the directory on the server that has been mounted on the client computer, and has the syntax: MACHINE NAME OF SERVER:PATH OF DIRECTORY ON SERVER WHERE MOUNTED:PATH TO WHERE MOUNTED ON CLIENT. For example, if the fileserver is named "DistServer" and contains a directory "/Export/SharedDist" in which the file to be cached is located, and the local user (i.e., the client) wishes to place the cached data in a directory named "FklserDist", the filesystem identifier would take the form "DistServer:/Export/SharedDist:FLlserDist". Other systems for identifying filesystems will be apparent to those of skill in the art.

Beneath the machine name level are stored additional file group directories 306, 308 and 310 for the various files, such as file 312, that contain file data for the files being accessed from the server. In one embodiment, the files are indexed by reference to the index node (INODE) reference number of the file being accessed from the server. The use of INODE numbers for file addressing will be familiar to those of skill in the art in UNIX programming and especially those of skill in the art in network programming using Network File System (NFS). However, it will be appreciated by those of skill in the art that other methods for identifying files across the network can be used without departing from the present invention.

Figure 4:
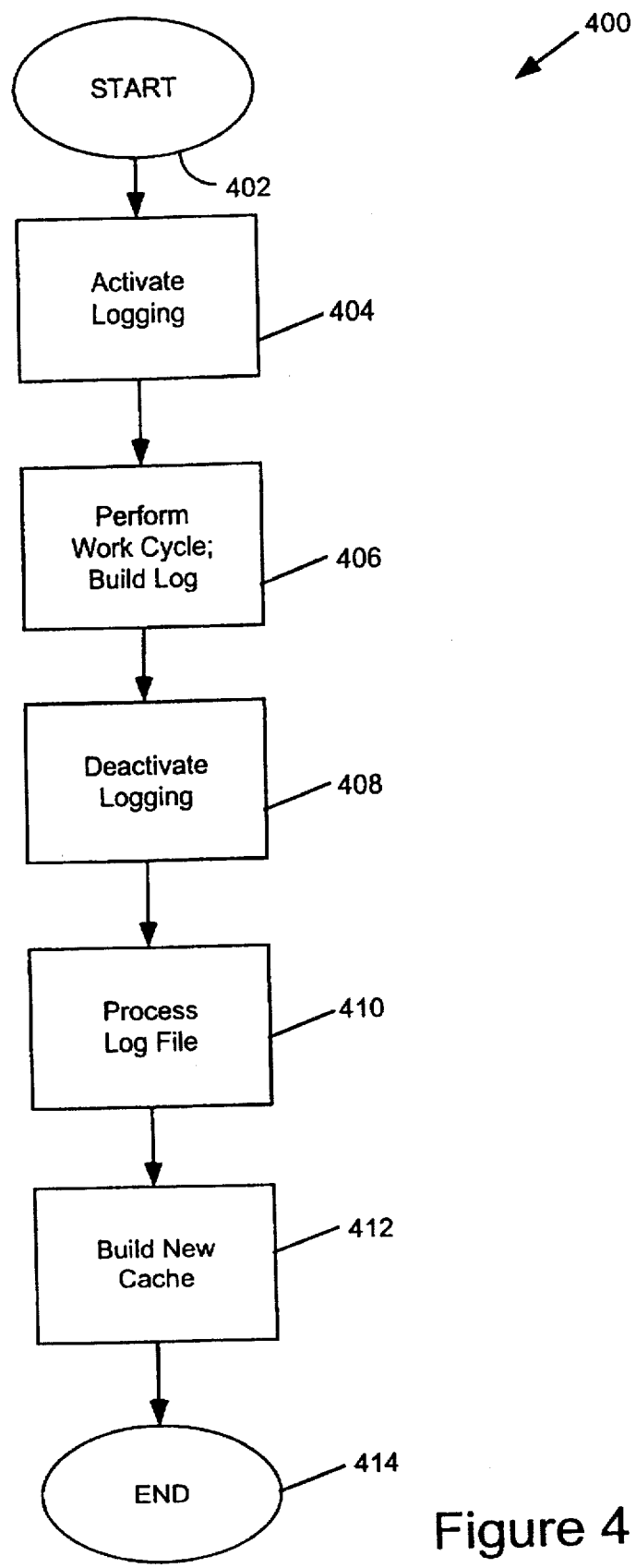
FIG. 4 is a flowchart illustrating a method of determining a file cache size in accordance with the present invention.

FIG. 4 illustrates one embodiment of the invention for estimating a cache file size in providing a cache file at 400 in FIG. 4. Beginning at step 402, a logging mechanism is activated at step 404 and, at step 406, the user of the computer performs a work cycle during which time a log is built of the filesystem operations that occurred during the work cycle. As used herein, the term "work cycle" refers to the operations performed by the user on the computer for a certain period of time. The operations that may be performed include, but are not limited to, file operations such as opening files, editing files, saving files, mounting different filesystems and different servers, reading directories, linking files, removing files, removing directories, creating files and creating directories. In addition, program operations such as creating graphics, spell checking, moving images or text, editing, compiling and running programming code, and printing documents are operations that can be performed during a work cycle. The time period during which a work cycle can occur can be any time period defined by the user. Preferably, the user will define a time period that reflects accurately the operations that are performed by the user in performing their work on their local computer. Thus a typical time frame includes, but is not limited to, a period of hours, a day or several days, a week, a month or a year. Typically, a user will chose a time frame on the order of days or a week as that commonly reflects the work performed by the user on their local computer.

Following step 406, at the completion of the work cycle, the logging mechanism is deactivated at step 408 and, at step 410, the log file created in step 406 is processed to provide an estimate of the cache size required to handle the filesystem operations invoked during the work cycle in step 406. The details of this processing step 410 will be described more fully below.

At step 412 a new cache is built using the estimated file cache size determined in step 410. It will be appreciated that the new cache may be constructed automatically, replacing the cache estimated by the user during the work cycle of step 406, or the user may simply be notified of the estimated file cache size and the construction of the cache is left to the user. The construction of file caches is known to those of skill in the art. In one embodiment, the user estimates the file cache size required for the work cycle of step 406 and creates the cache using methods that are appropriate to the operating system of the network and the computer. Upon processing of the log file, the user is notified of the calculated file cache size for the work cycle at which point the user redefines the file cache using the estimate provided by the determination of step 410. Alternatively, both steps could be handled automatically by the filesystem in which the filesystem first creates a file cache of a predetermined size to be used during the work cycle of step 406 and, upon completion of the calculation of the new file cache size in step 410 the filesystem automatically replaces the previous file cache with a file cache having the calculated size. Other methods will be apparent to those of skill in the art.

The activation process of the logging mechanism, step 404 of FIG. 4, is illustrated in greater detail at 500 in FIG.

Figure 5:
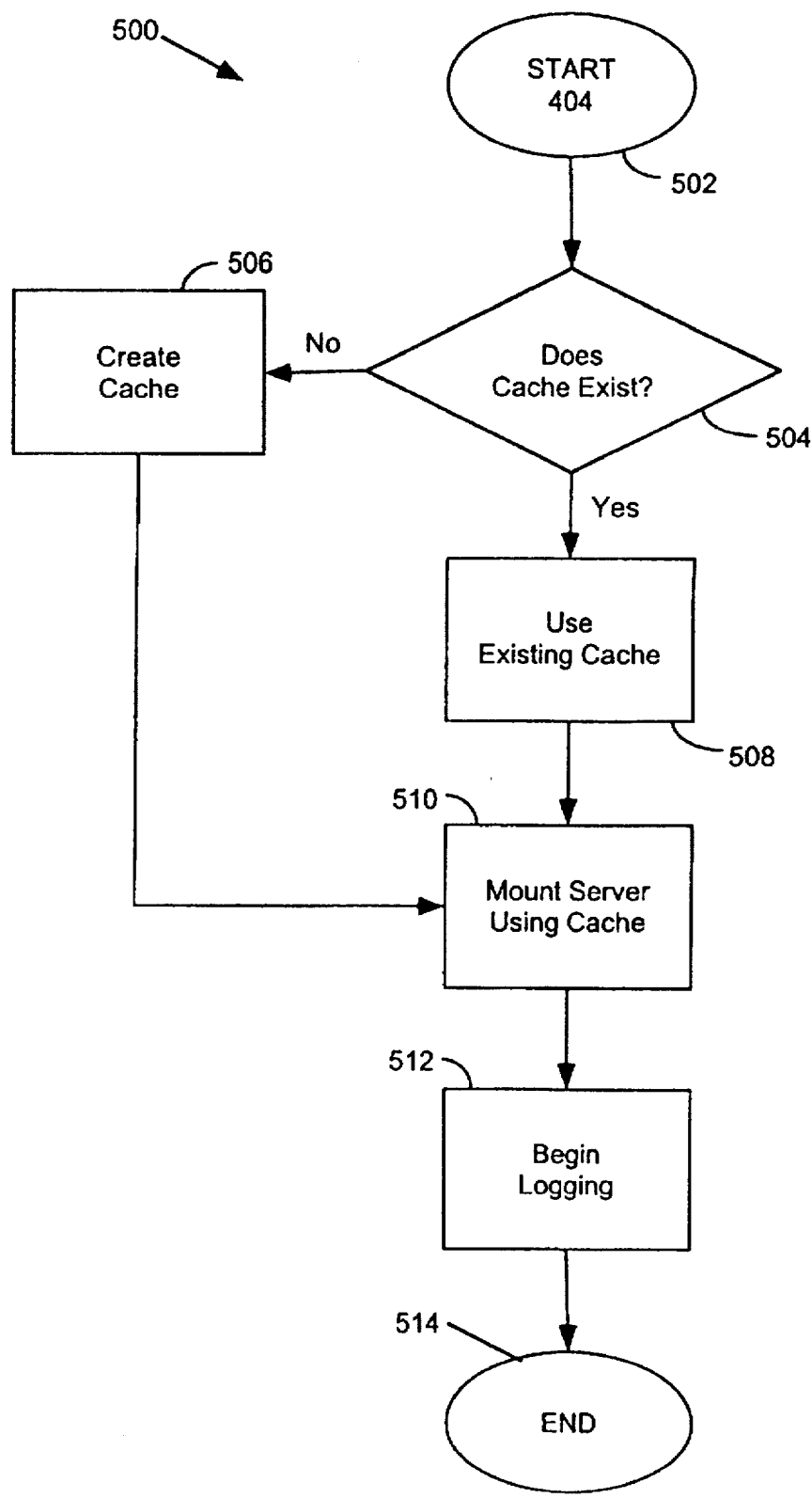
FIG. 5 is a flowchart illustrating step 404 of FIG. 4 in greater detail.

5. There, beginning at step 502, the check is made to determine whether a file cache exists on the local system at step 504. If no cache exists, then at step 506 a preliminary cache is created, as described above, and the server holding the data to be cached is mounted using the file cache at step 510. Otherwise, if a cache has been defined previously, the existing cache is used at step 508 and the server is mounted at step 510 as illustrated. Once the logging function is activated, the logging is initiated at step 512 and, at step 514, the process is terminated. The user then performs the work cycle as described above during which time the filesystem operations are logged as described below. It will be appreciated that the above-described steps of FIG. 5 can be implemented using known methods.

Figure 6:
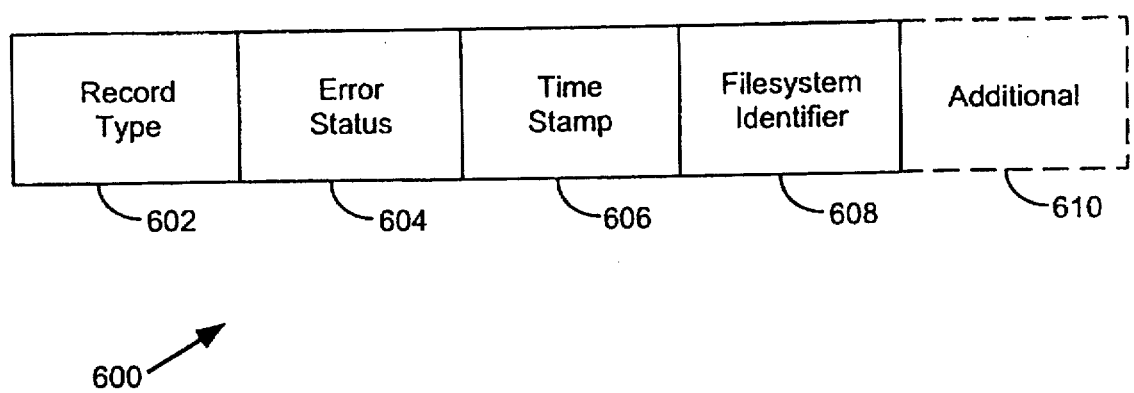
FIG. 6 is a diagram illustrating the data structure of a logging record in accordance with the present invention.

The logging mechanism of the present invention produces a series of logging records of certain filesystem transaction that are invoked by the user during the work cycle. A data structure for a file record of the present invention is illustrated in FIG. 6 at 600. The record data structure includes a record type field 602, an error status field 604, a time stamp field 606, a filesystem identifier field 608 and, optionally, additional fields as indicated at 610. The record type field 602 indicates the type of operation performed by the filesystem on the file that is associated with the file record. The error status field 604 indicates whether an error has occurred with respect to the record and will be described in more detail below. Time stamp field 606 indicates the time at which an operation was performed on the file associated with the record. This field is not strictly required and may be deleted from the record without affecting the performance of the present invention. Filesystem identifier field 608 describes which filesystem the file associated with the record resides in. It will be appreciated by those of skill in the art that other methods of identifying the file location may be used in accordance with the present invention. Additional fields, as indicated generally at 610, may also be required depending on the information stored in the record.

In one embodiment, the logging records are stored as binary data using the External Data Representation (XDR) format. The XDR format will be familiar to those of skill in the art. In another embodiment, the logging records comprise records for filesystem operations including mounting and unmounting a filesystem; retrieving data from a file, a directory or a symbolic link (i.e., a pointer to a file); deleting dam from a file; deleting a file or directory; deleting a file from the cache; writing data to a file; creating a file, directory or symbolic link; renaming a file; retrieving data from a file; determining the cache size; adding a file, directory or symbolic link to the cache; retrieving data from a file, directory or symbolic link in the cache; removing a file, directory or symbolic link from the cache; and checking the allocation of memory in the cache. It will be appreciated that other types of operations may be added to, or subtracted from, this exemplary list without departing from the present invention.

One embodiment of the above-described records is illustrated below. The records CACHEFS_LOG_MOUNT and CACHEFS_LOG_UMOUNT are records for mounting and unmounting a filesystem. The records CACHEFS_LOG_GETPAGE_RECORD, CACHEFS_LOG_READDIR_RECORD and CACHEFS_LOG_READLINK_RECORD are records for retrieving data from a file, directory or symbolic link, respectively. The records CACHEFS_LOG_REMOVE_RECORD and CACHEFS_LOG_RMDIR_RECORD are records for deleting a file or directory. The record CACHEFS_LOG_TRUNCATE_RECORD records the deletion of data from a file. The record CACHEFS_LOG_PUTPAGE_RECORD records the writing of data to a file. The records CACHEFS_LOG_CREATE_RECORD, CACHEFS_LOG_MKDIR_RECORD and CACHEFS_LOG_SYMLINK_RECORD record the creation of a file, directory or symbolic link. The record CACHEFS_LOG_RENAME records the renaming of a file. The record CACHEFS_LOG_POPULATE, CACHEFS_LOG_CSYMLINK, CACHEFS_LOG_FILLDIR are records of adding a file, symbolic link or directory to the file cache, respectively. The records CACHEFS_LOG_GPFRONT and CACHEFS_LOG_RFDIR describe the retrieval of data from a file or directory in the file cache, respectively. CACHEFS_LOG_UALLOC and CACHEFS_LOG_CALLOC record the allocation of space in the cache and a check of the allocation map of a file in the file cache. Finally, CACHEFS_LOG_NOCACHE_RECORD is a record of the deletion of any file from the cache. It will be appreciated that the records shown here are merely examples and that other records and/or other fields will be apparent to those having skill in the art.

```
struct cachefs_log_mount_record {
    int type;           /* = CACHEFS_LOG_MOUNT */
    int error;          /* error flag */
    time_t time;        /* time stamp */
    caddr_t vfsp;       /* filesystem identifier */
    u_int flags;        /* MODIFY flag */
    u_short pathlen;    /* length (in bytes) of filesystem
    identifer */
    u_short cacheidlen; /* length (in bytes) of cacheid */
    char path[2];       /* the path to the filesystem, and the
                           cacheid */
}
struct cachefs_log_umount_record {
    int type;           /* = CACHEFS_LOG_UMOUNT */
    int error;          /* error flag */
    time_t time;        /* time stamp */
    caddr_t vfsp;       /* filesystem identifier for filesystem
    being unmounted */
}
struct cachefs_log_getpage_record {
    int type;           /* = CACHEFS_LOG_GETPAGE */
    int error;          /* error flag */
    time_t time;        /* time stamp */
    caddr_t vfsp;       /* filesystem identifier */
    fid_t fid;          /* file identifier */
    u_int offset;       /* offset (in bytes) in file of data
    being retrieved */
    u_int len;          /* number of bytes of data being retrieved
    */
}
struct cachefs_log_readdir_record {
    int type;           /* = CACHEFS_LOG_READDIR */
    int error;          /* error flag */
    time_t time;        /* time stamp */
    caddr_t vfsp;       /* filesystem identifier */
    fid_t fid;          /* file identifier */
    off_t offset;       /* offset (in bytes) into directory */
}
struct cachefs_log_readlink_record {
    int type;           /* = CACHEFS_LOG_READLINK */
    int error;          /* error flag */
    time_t time;        /* time stamp */
    caddr_t vfsp;       /* filesystem identifier */
    fid_t fid;          /* file identifier */
    size_t length;      /* length (in bytes) of file indirected
    by symbolic link */
}
struct cachefs_log_remove_record {
    int type;           /* = CACHEFS_LOG_REMOVE */
    int error;          /* error flag */
    time_t time;        /* time stamp */
    caddr_t vfsp;       /* filesystem identifier */
    fid_t fid;          /* file identifier of file being deleted */
```

```
}
struct cachefs_log_rmdir_record {
    int type;           /* = CACHEFS_LOG_RMDIR */
    int error;          /* error flag */
    time_t time;        /* time stamp */
    caddr_t vfsp;       /* filesystem identifier */
    fid_t fid;          /* file identifier of directory being
                           removed */
}
struct cachefs_log_truncate_record {
    int type;           /* = CACHEFS_LOG_TRUNCATE */
    int error;          /* error flag */
    time_t time;        /* time stamp */
    caddr_t vfsp;       /* filesystem identifier */
    fid_t fid;          /* file identifier of file being truncated
                         */
    size_t size;        /* new size of file */
}
struct cachefs_log_putpage_record {
    int type;           /* = CACHEFS_LOG_PUTPAGE */
    int error;          /* error flag */
    time_t time;        /* time stamp */
    caddr_t vfsp;       /* filesystem identifier */
    fid_t fid;          /* file identifier of file to which data is
                           being written */
    u_int offset;       /* offset (in bytes) into file where
                           data is to be added */
    u_int len;          /* length (in bytes) of data being added */
}
struct cachefs_log_create_record {
    int type;           /* = CACHEFS_LOG_CREATE */
    int error;          /* error flag */
    time_t time;        /* time stamp */
    caddr_t vfsp;       /* filesystem identifier */
    fid_t fid;          /* file identifier of newly created file */
}
struct cachefs_log_mkdir_record {
    int type;           /* = CACHEFS_LOG_MKDIR */
    int error;          /* error flag */
    time_t time;        /* time stamp */
    caddr_t vfsp;       /* filesystem identifier */
    fid_t fid;          /* file identifier of newly created
                           directory */
}
struct cachefs_log_rename_record {
    int type;           /* = CACHEFS_LOG_RENAME */
    int error;          /* error flag */
    time_t time;        /* time stamp */
    caddr_t vfsp;       /* filesystem identifier */
    fid_t gone;         /* file identifier of file being
                           removed (only if "removed" is non-zero) */
    int removed;        /* nonzero if file was removed */
}
struct cachefs_log_symlink_record {
    int type;           /* = CACHEFS_LOG_SYMLINK */
    int error;          /* error flag */
    time_t time;        /* time stamp */
    caddr_t vfsp;       /* filesystem identifier */
    fid_t fid;          /* file identifier of newly created symbolic
                           link */
    size_t size;        /* size of newly created symbolic link
                         */
}
struct cachefs_log_populate_record {
    int type;           /* = CACHEFS_LOG_POPULATE */
    int error;          /* error flag */
    time_t time;        /* time stamp */
    caddr_t vfsp;       /* filesystem identifier */
    fid_t fid;          /* file identifier of file being populated
                         */
    u_int off;          /* offset (in bytes) */
    int size;           /* length of cached file (in bytes) */
}
struct cachefs_log_csymlink_record {
    int type;           /* = CACHEFS_LOG_CSYMLINK */
    int error;          /* error flag */
    time_t time;        /* time stamp */
    caddr_t vfsp;       /* filesystem identifier */
    fid_t fid;          /* file identifier of symbolic link being
                           cached */
    int size;           /* size of symbolic link being cached */
}
struct cachefs_log_filldir_record {
    int type;           /* = CACHEFS_LOG_FILLDIR */
    int error;          /* error flag */
    time_t time;        /* time stamp */
    caddr_t vfsp;       /* filesystem identifier */
    fid_t fid;          /* file identifier of directory being filled
                         */
    int size;           /* size of directory being cached */
}
struct cachefs_log_gpfront_record {
    int type;           /* = CACHEFS_LOG_GPFRONT */
    int error;          /* error flag */
    time_t time;        /* time stamp */
    caddr_t vfsp;       /* filesystem identifier */
    fid_t fid;          /* file identifier of file from which data
                           is retrieved */
    u_int off;          /* offset (in bytes) */
    u_int len;          /* length (in bytes) */
}
struct cachefs_log_rfdir_record {
    int type;           /* = CACHEFS_LOG_RFDIR */
    int error;          /* error flag */
    time_t time;        /* time stamp */
    caddr_t vfsp;       /* filesystem identifier */
    fid_t fid;          /* file identifier of directory */
}
struct cachefs_log_ualloc_record {
    int type;           /* = CACHEFS_LOG_UALLOC */
    int error;          /* error flag */
    time_t time;        /* time stamp */
    caddr_t vfsp;       /* filesystem identifier */
    fid_t fid;          /* file identifier of allocmap-updated file
                         */
    u_int off;          /* offset (in bytes) of new area reserved in
                           cache */
    u_int len;          /* length (in bytes) of new area reserved in
                           cache */
}
struct cachefs_log_calloc_record {
    int type;           /* = CACHEFS_LOG_CALLOC */
    int error;          /* error flag */
    time_t time;        /* time stamp */
    caddr_t vfsp;       /* filesystem identifier */
    fid_t fid;          /* file identifier of allocmap-check file
                         */
    u_int off;          /* offset (in bytes) of successful
                           check_allocmap */
    u_int len;          /* length (in bytes) of sucessful
                           check_allocmap */
}
struct cachefs_log_nocache_record {
    int type;           /* = CACHEFS_LOG_NOCACHE */
    int error;          /* error flag */
    time_t time;        /* time stamp */
    caddr_t vfsp;       /* filesystem identifier */
    fid_t fid;          /* file identifier of file being removed
                           from cache */
}
```

Each of the exemplary records above includes the fields "type", "error", "time" and "vfsp" corresponding to fields 602, 604, 606 and 608 of FIG. 6 respectively. In the example shown, the "type" field is an identifier of the type of filesystem operation logged by the logging mechanism (e.g., mounting a filesystem, deleting a file or caching a directory). The record types for the exemplary records shown are described above. The "error" field indicates whether the record is in an error state as discussed below with respect to FIG. 8. The "time" filed holds a time stamp indicating the time at which the operation on the file associated with the record was created. The "vfsp" field holds a filesystem identifier as described above.

The exemplary records above may also contain additional fields that are appended to the record as shown generally by field 610 and are described in the comments as will be apparent to those having skill in the art. In particular, the record for filesystem mounting operations includes an additional "flags" field, indicating which options are chosen for mounting a filesystem. These options include a flag indicating whether a file is to be removed from the cache once it has been modified as described below. Also included are a "pathlen" field and a "cacheidlen" field indicating the lengths of the filesystem identifier and the cacheid, respectively. Further included is the array "path" that includes the paths to the filesystem and the cacheid. These quantities will be familiar to those of skill in the art.

With respect to the remaining records shown, these records may include a file identifier field "fid" that is used in records not associated with filesystem mount or unmount operations. This identifier can be any identifier used by the network and/or client operating system(s) to identify uniquely a file, directory or symbolic link. For example, the file identifier can be the INODE number (described above) alone, or joined with additional information, such as an IP (Internet Protocol) address. The filesystem identifier for files being renamed, is located in the "gone" field. The value of this field is dependent on the value of another field, the "removed" field which is non-zero if the file was renamed. Other file identifiers will be apparent to those having skill in the art of computer networks and computer operating systems. The fields "offset" and "len" denote the offset (in bytes) at which a particular block of data is located in a file and the length (in bytes) of that block of data. This information is also included in the fields "off" and "size".

Figure 7:
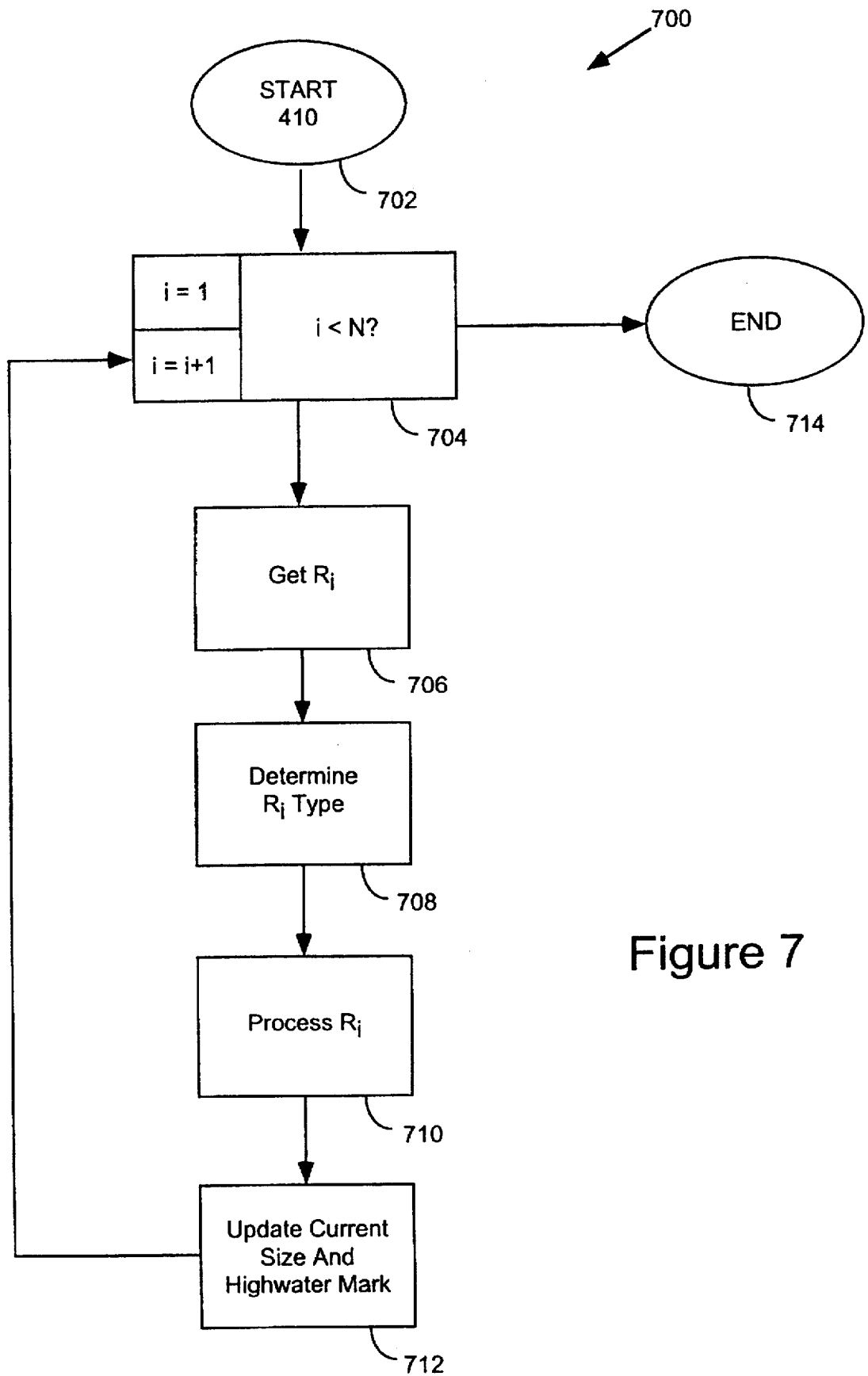
FIG. 7 is a flowchart illustrating step 410 of FIG. 4 in greater detail.

The processing of the log file, step 410 of FIG. 4, is described in detail with respect to FIG. 7 at 700. There, beginning at step 702, each of the record files $R_i$, (i=1, . . . , N) stored in the log file is processed at step 704. Within loop 704 the $i^{th}$ record ($R_i$) is retrieved at step 706 and its record type is determined to identify the logged operation at step 708. In one embodiment, this record type is one of the record types described above. At step 710 the record $R_i$ is processed as will be described in greater detail below, and, at step 712, the current file cache size is updated. A highwater mark indicating the maximum file cache size as of the processing of the current record, is also updated at step 712. Upon the processing of the last record the process terminates at step 714.

Figure 8A:
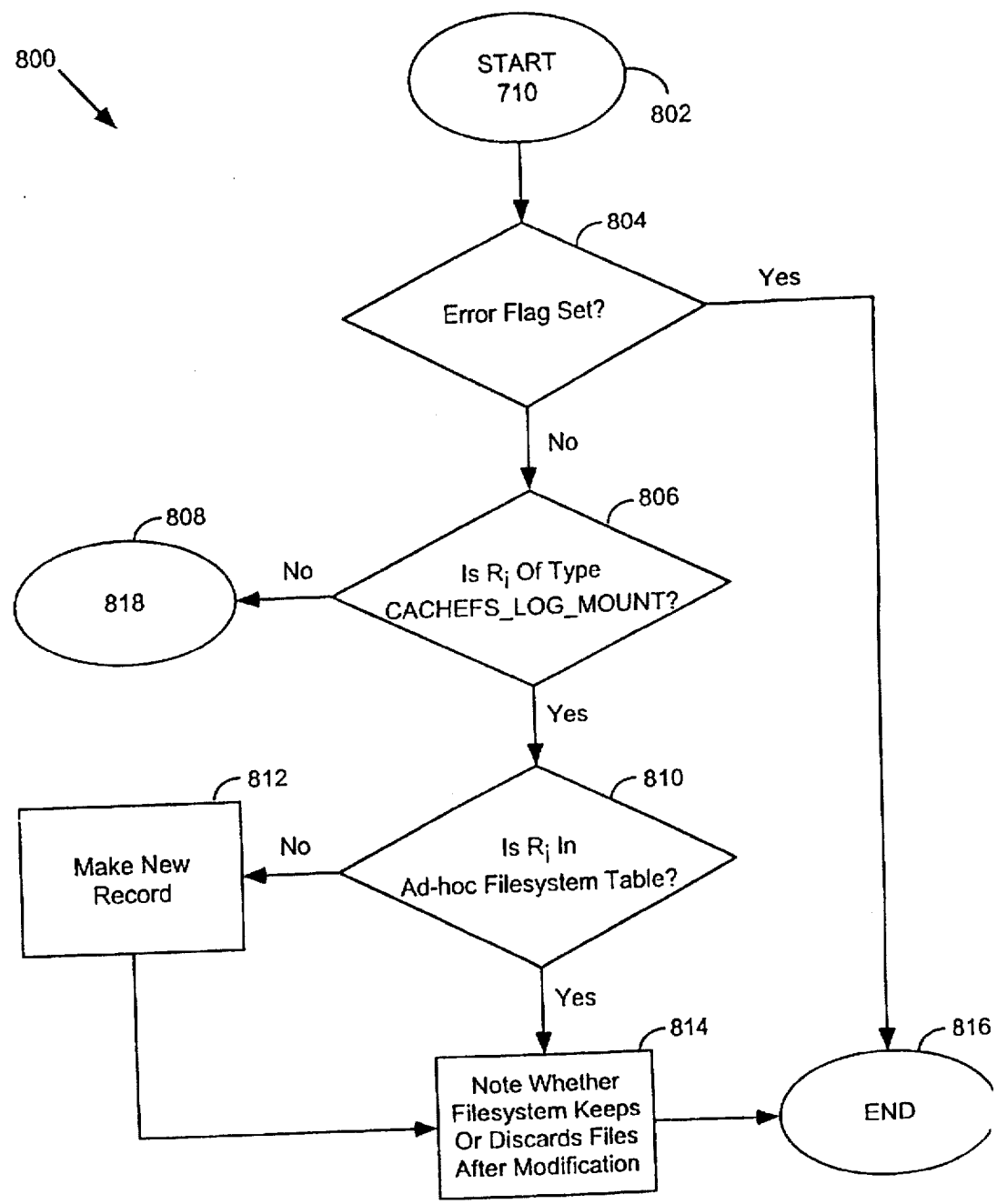
FIGS. 8A and 8B are flowcharts illustrating step 710 of FIG. 7 in greater detail.

The processing step 710 of FIG. 7 is described in greater detail at 800 in FIG. 8A. Beginning at step 802 a determination is made as to the error status of the record at step 804. This can be accomplished, for example, by checking field 604 of record 600 shown in FIG. 6 above. If the error flag is not set then, at step 806, a determination is made as to whether the record is of a filesystem mount operation, (e.g., type CACHEFS_LOG_MOUNT as described above). If the answer to this query is true, then, at step 810, a determination is made as to whether the record is included in an ad-hoc filesystem table. In one embodiment, the ad-hoc filesystem table is a temporary array reserved in memory, e.g., RAM 206 of FIG. 2, into which table is entered information regarding the filesystem identifier (e.g., the vfs pointer of the filesystem) and whether the filesystem retains modified files in the file cache or removes modified files from the file cache, as will be described in greater detail below. If the record is not in the ad-hoc filesystem table, then a new record is created in that table at step 812, and, at step 814, a notation is made as to whether the filesystem will keep of discard this file after its modification. The process then terminates at step 816. Referring back to step 804, if the error flag is set then the process immediately terminates at step 816.

Referring back to step 808, if the record is not of a mount operation (e.g., CACHEFS_LOG_MOUNT) then the process moves to step 818 as described below in FIG. 8B. Following transfer from step 808 above, the file identifier (File ID) of the file associated with the record is determined at step 818 and, at step 820, a determination is made whether the record is included in an ad-hoc file table. In one embodiment, the ad-hoc file table, like the ad-hoc filesystem table described above, is a table created in memory into which file information such as the file identifier (e.g., the variable "fid_t" in the struct "cachefs_log_getpage record" above) is stored. If the record is not included in the ad-hoc file table then, at step 822, a new record is created. At step 824 a determination is made as to whether this record is in the ad-hoc filesystem table. However, if the record is determined to be in the ad-hoc file table at step 820, then the process moves directly to step 824.

If the record is not in the ad-hoc filesystem table then a bad record error is returned and the error status flag is set to true in field 604 of FIG. 6. The process then terminates by returning to step 816. If the record is determined to be in the ad-hoc filesystem table, then the length of the data in the file cache of the file associated with the record is subtracted from the file cache size in step 828 and, at step 830 the amount of memory space occupied by the file following the operation recorded by the $i^{th}$ logging record is determined at step 830. As step 832 that length is added (or subtracted) from the current cache size. If, at step 833, the current cache size is determined to be greater than the highwater mark, then, at step 834, the highwater mark of the file cache, i.e., the maximum file cache size, is set to the current cache size as determined above in step 832. The process then terminates by returning back to step 816.

Figure 8B:
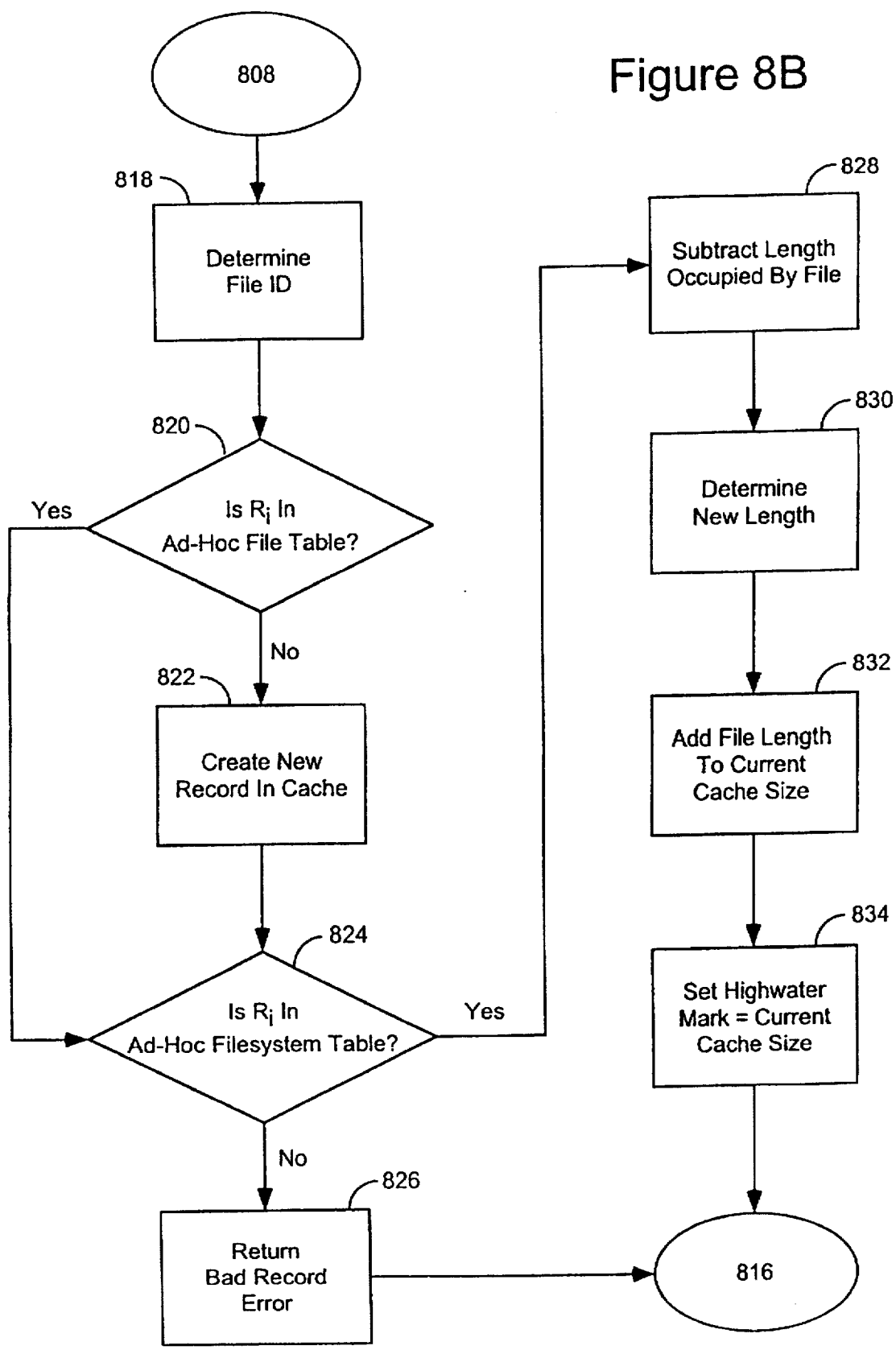
Figure 9:
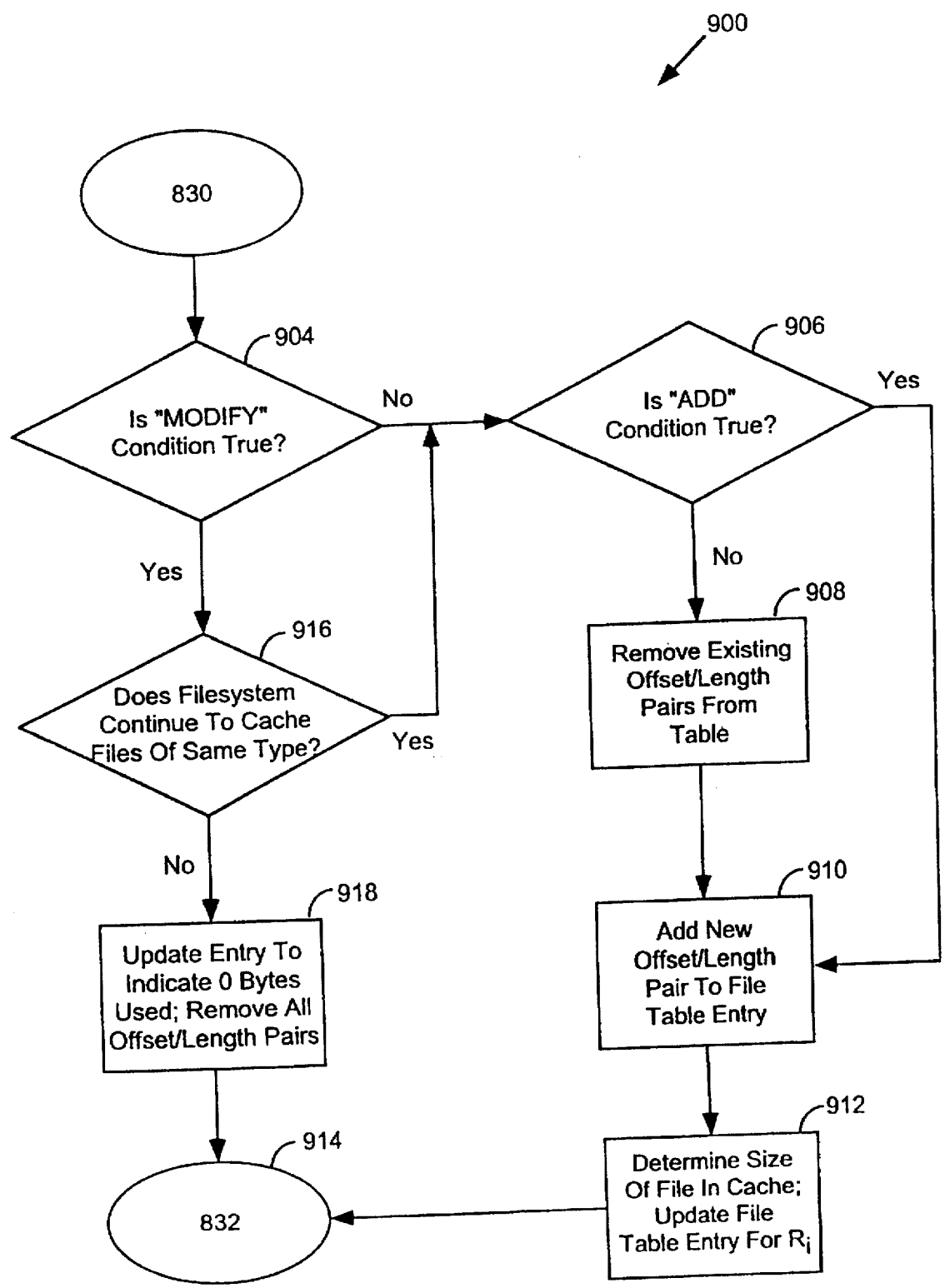
FIG. 9 is a flowchart illustrating step 830 of FIG. 8B in greater detail.

Step 830 shown in FIG. 8B is illustrated in greater detail at 900 in FIG. 9. By way of background, certain file operation records include an offset and a length describing the portion of data from a file that is loaded into a file cache. The offset refers to the location within the file at which data is retrieved. The length indicates the amount of data that is actually stored in the file cache. For example, if the file "MY_FILE" has a total size of 5000 bytes and the filesystem downloads 500 bytes beginning at the $1000^{th}$ byte of the file, i.e. at offset 1000, the offset of the record would be set to 1000 and the length would be set to 500.

In addition, all file operation records also indicate whether the offset and the length data should be added to the space occupied by the portion of the file in the file cache (an "ADD" condition) or that the offset and length should be adjusted to indicate all of the space that the file is occupying in the file cache (a "TRUNCATE" condition). Some record types may also include a "MODIFY" condition independent of whether they include an ADD or TRUNCATE condition. The modify condition indicates that when a file is modified a determination must be made as to whether the file is to be subsequently removed from the file cache. This last condition is imposed to account for situations in which the filesystem requires that file modifications be made directly to the entire file that is stored on the fileserver and not to the file copy that is kept in the file cache. Such a condition avoids confusion of file revisions by preventing multiple users from making changes to a file independently and then trying to store inconsistently modified files back to the fileserver.

Referring now to FIG. 9, beginning at step 902, a determination is made as to whether the file record includes a MODIFY condition at step 904. If the file does not have a MODIFY condition, then, at step 906, a determination is made as to whether the file record contains an ADD condition. If no ADD condition is found then, at step 908 any offset and length information for that file already present is removed from the table and, at step 910 the new offset and lengths are added to the file table entry. Alternatively if the add condition is true at step 906 the process moves directly to step 910. In either case, at step 912, the size of the file in the cache is determined and the file entry table for the i<sup>th</sup> record is updated at step 912. The process then returns to step 832 of FIG. 8B at step 914.

Referring back to step 904, if the MODIFY condition is found to be true, then at step 916 a determination is made as to whether the filesystem will continue to cache files of the same type after modification. If the answer at step 916 is "yes", then the program process moves back to step 906 as described above. However, if the filesystem will not continue to cache files of the same type following modification then at step 918 the entsies updated to indicate that zero bytes are being used by that file and all offset and lengths are removed. The process then terminates at step 914.

Figure 10:
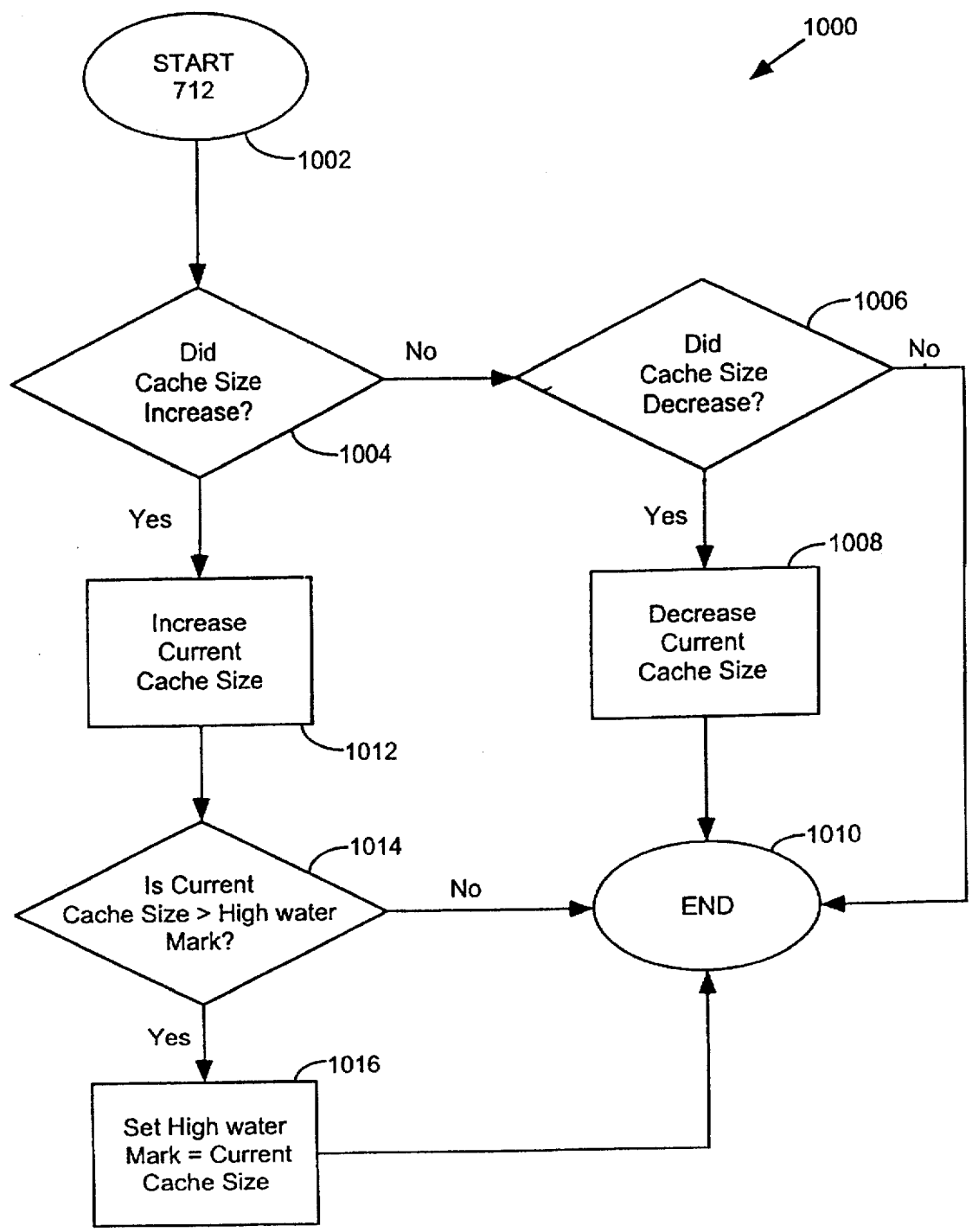
FIG. 10 is a flowchart illustrating step 712 of FIG. 7 in greater detail.

Step 712 in which the cache size and high water marks are updated, is illustrated in greater detail at 1000 in FIG. 10. Beginning at step 1002, a determination is made as to whether the cache size has increased at step 1004. If the cache size did not increase then, at step 1006, a determination is made as to whether the cache size decreased. If the cache size decreased, then the current cache size is decremented at step 1008, and at step 1010 the process ends. Alternatively, if the cache size neither increased nor decreased, i.e., the cache size remained constant, then the process moves directly to step 1010 from step 1006.

Referring back to step 1004, if the cache size increased then the current cache size is increased at step 1012, and, at step 1014, a determination is made as to whether the current cache size is greater then the highwater mark calculated in step 710 of FIG. 7. If the current cache size is less than the highwater mark, then the process terminates at step 1010. However, if the current cache size is greater than the highwater mark then, at step 1016, the high water mark is set to the current cache size and the process again terminates at step 1010. Thus, it will be appreciated that the present invention provides a method and apparatus for determining the size of a file cache that reflects the user's work load. Using the method and apparatus of the invention, a user can create a file cache based on the work they perform for a given period to time, rather than guessing at the appropriate cache size. This will be seen to enhance system performance as a file cache can be created that is sized appropriately for the tasks handled by the user.

Although the foregoing invention has been described in some detail for purposes of clarity of understanding, it will be apparent that certain changes and modifications may be practiced within the scope of the appended claims. For example, additional records can be included to log other filesystem transactions such as print spooling. Additional fields can be included in one or more of the logging records, such as additional file and/or filesystem identifiers or filesystem transaction parameters. The logging mechanism of the invention can also be configured to run on a client or fileserver computer, or portions of the logging mechanism of the invention can reside on each of the client and fileserver computers. Still further variations of the present invention include automatic creation of a file cache of predetermined size prior to activation of the logging mechanism. In addition, the file cache can be reconfigured automatically upon completion of the analysis of the filesystem log file.

What is claimed is:

1. A computer-implemented method for determining the size of a file cache on a computer, the computer-implemented method comprising the computer-implemented steps of:

activating a filesystem logging mechanism under computer control to monitor filesystem transactions performed on the computer;

providing under computer control a file cache for storing at least a portion of at least one computer file and a filesystem log file for storing records of filesystem transactions invoked by the computer;

performing under computer control a user work cycle during which user work cycle the filesystem logging mechanism monitors under computer control filesystem transactions invoked by the computer and stores records of certain filesystem transactions to the filesystem log file; and determining under computer control an appropriate size of the file cache based at least in part on the records stored in the filesystem log file.

2. The computer-implemented method as recited in claim 1, wherein the step of activating a filesystem logging mechanism includes the computer-implemented steps of:

a) determining under computer control whether a prior file cache exists in memory associated with the computer; and b) mounting under computer control a filesystem, wherein the step of mounting includes identifying the file cache as the location for storing data transferred from the filesystem to the computer.

3. The computer-implemented method as recited in claim 2, further including the step of creating a file cache under computer control in response to a determination that a file cache does not exist in memory associated with the computer.

4. The computer-implemented method as recited in claim 1, wherein the step of storing records of certain filesystem transactions comprises the step of writing under computer control logging records corresponding to certain filesystem transactions to the filesystem log file.

5. The computer-implemented method as recited in claim 1, wherein the step of determining the size of the file cache comprises the computer-implemented steps of:

a) determining a record type for each record stored in the filesystem log file;

b) processing each record stored in the filesystem log file; and c) updating a cache size indicator to reflect the size of the file cache required to store data associated with the record that is transferred from the filesystem to the file cache.

6. The computer-implemented method as recited in claim 5, wherein the step of processing each record stored in the filesystem log file comprises the computer-implemented steps of:

a) determining that the record type is a file record;

b) determining that the file record is listed in an ad-hoc filesystem table;

c) subtracting the amount of memory space occupied by the data associated with the file record from the file cache size; and d) determining the present amount of memory space occupied by data associated with the file record and adding that amount of memory space to the file cache size.

7. The computer-implemented method as recited in claim 6, wherein the step of determining the present amount of space occupied by the data associated with the file record comprises the computer-implemented steps of:
 a) determining whether the file associated with the file record has been modified; and
 b) determining whether additional memory space should be added to the current cache size when the file associated with the file record has not been modified.

8. The computer-implemented method as recited in claim 7, further including the step of determining whether the filesystem continues to cache modified files when the file associated with the file record has been modified.

9. A computer system configured to implement the method of claim 1.

10. A computer system for determining the size of a file cache, the computer system comprising:
 a file cache for storing at least a portion of at least one computer file:
 a filesystem log file for storing records of filesystem transactions;
 a filesystem logging mechanism that monitors filesystem transactions performed during a user work cycle and stores records of certain filesystem transactions to the filesystem log file; and
 a filesystem log file processing mechanism for determining an appropriate size of the file cache based at least in part on the records stored in the filesystem log file.

11. The computer system as recited in claim 10, wherein the computer system comprises a computer coupled to a computer network including a fileserver, the file cache is located in memory associated with the computer, and the filesystem transactions monitored by the filesystem logging mechanism include copying at least a portion of a least one file stored on the fileserver to the file cache.

12. The computer system as recited in claim 11, wherein the file cache is located in mass storage coupled with the computer.

13. The computer system as recited in claim 12, wherein the filesystem logging mechanism includes:
 a) a prior file cache check mechanism to determine whether a prior file cache exists in memory associated with the computer; and
 b) a fileserver mounter capable of identifying the file cache as the location for storing data transferred from the fileserver to the computer.

14. The computer system as recited in claim 13, further including a file cache creation mechanism for creating a file cache when a file cache does not already exist in memory associated with the computer.

15. The computer system as recited in claim 14, wherein the logging records include fields for at least a record type, an error status flag and a filesystem identifier.

16. The computer system as recited in claim 10, wherein the filesystem log file processing mechanism comprises:
 a) a record type discriminator capable of determining the record type for each record stored in the filesystem log file;
 b) a record processing mechanism that is capable of determining the amount of memory occupied by the file associated with the record; and
 c) a cache size updating mechanism capable of determining the size of the file cache required to store the data referenced by the records stored in the log file.

17. A computer program product comprising a computer usable medium having computer readable code embodied thereon for determining the size of a file cache, the computer program product comprising:
 computer readable program code devices configured to cause a computer to activate a filesystem logging mechanism that operates under computer control to monitor filesystem transactions performed on the computer;
 computer readable program code devices configured to cause a computer to provide a file cache for storing a least a portion of at least one computer file therein and a filesystem log file for storing records of filesystem transactions invoked by the computer while the filesystem logging mechanism is monitoring filesystem transactions performed on the computer;
 computer readable program code devices configured to cause a computer to store records of certain filesystem transactions invoked by the computer while the filesystem logging mechanism is monitoring filesystem transactions performed on the computer to the filesystem log file; and
 computer readable program code devices configured to cause a computer to determine an appropriate size of the file cache based at least in part on the records stored in the filesystem log file.

18. The computer program product as recited in claim 17, wherein the computer is coupled with a computer network including a fileserver, and the filesystem transactions invoked by the computer include copying at least a portion of a least one file stored on the fileserver to the file cache.

19. The computer program product as recited in claim 18, wherein the file cache is located in mass storage coupled with the computer.

20. The computer program product as recited in claim 19, wherein the logging records include fields for at least a record type, an error status flag, a time stamp and a filesystem identifier.

21. The computer program product as recited in claim 17, wherein the computer readable program code devices configured to cause a computer to determine the size of the file cache include:
 a) computer readable program code devices configured to cause a computer to determine the record type for each record stored in the filesystem log file;
 b) computer readable program code devices configured to cause a computer to process each record stored in the filesystem log file; and
 c) computer readable program code devices configured to cause a computer to update a cache size indicator to reflect the size of the file cache required to store the data referenced by the records stored in the log file.

22. A computer system configured to implement the computer program product of claim 17.

23. A computer-implemented method as recited in claim 1, wherein the step of determining the size of the file cache includes the computer-implemented step of accessing and utilizing the stored records of certain filesystem transactions to the filesystem log file.

24. A computer-implemented method as recited in claim 1, further including the computer-implemented step of setting the file cache size to an appropriate size based upon a user work load during the user work cycle.

25. A computer-implemented method as recited in claim 1 wherein the appropriate file cache size includes a near-optimal file cache size.

26. A computer-implemented method as recited in claim 1 wherein the user work cycle is defined by a user on one computer for a length of time set by the user.

27. A computer program product comprising a computer usable medium as recited in claim 17, wherein the computer readable program code devices configured to cause a computer to determine the size of the file cache includes program code devices configured to access and utilize records of certain filesystem transactions stored in the filesystem log file.

28. A computer program product comprising a computer usable medium as recited in claim 17, further including program code devices configured to set the file cache size to an appropriate size based upon a user work load during a user work cycle.

29. A computer program product comprising a computer usable medium as recited in claim 17, further including computer readable program code devices configured to cause a computer to store records of certain filesystem transactions to a filesystem log file during a user work cycle.

30. A computer program product comprising a computer usable medium as recited in claim 17 wherein the appropriate file cache size includes a near-optima file cache size.

* * * * *